Figure 1:
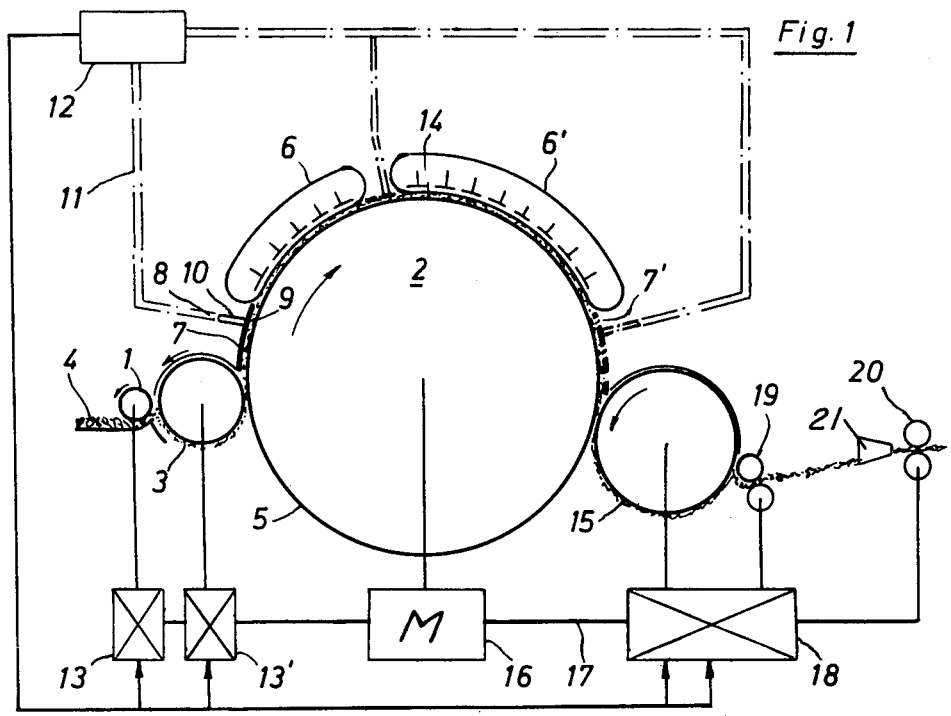

United States Patent [19]

Staheli

[11] 4,075,739
[45] Feb. 28, 1978

[54] METHOD AND APPARATUS FOR CONTROLLING A CARD

[75] Inventor: Paul Staheli, CH-9535 Wilen near Wil, Switzerland

[73] Assignee: Rieter Machine Works, Ltd., Winterthur, Switzerland

[21] Appl. No.: 626,864

[22] Filed: Oct. 29, 1975

[30] Foreign Application Priority Data

Nov. 1, 1974  Switzerland ............... 14652/74

[51] Int. Cl.² ..................................... D01H 5/32
[52] U.S. Cl. ................................. 19/240; 73/37.7
[58] Field of Search .......... 19/239, 240, 241, 106 R, 19/97.5; 73/37.5, 37.6, 37.7

[56] References Cited

U.S. PATENT DOCUMENTS

| | | | |
|---|---|---|---|
| 3,108,332 | 10/1963 | Moss et al. | 19/240 X |
| 3,239,890 | 3/1966 | Caughlin | 19/240 X |
| 3,256,569 | 6/1966 | Draving | 19/240 X |
| 3,754,433 | 8/1973 | Hyer | 73/37.6 |

FOREIGN PATENT DOCUMENTS

| | | | |
|---|---|---|---|
| 1,217,800 | 12/1959 | France | 19/106 R |
| 466,105 | 1/1969 | Switzerland | 19/240 |

*Primary Examiner*—Dorsey Newton

[57] ABSTRACT

A pneumatic measuring means is placed over the main cylinder to measure pressure variations due to changes in fiber layer thickness. The measured pressures are transmitted to a measuring and control means which compares the measured pressures to a pre-set value and produces a difference signal which is then used to control the card. The difference signal can be imposed on the supply means for the card, the doffing means or the drafting means.

11 Claims, 2 Drawing Figures

METHOD AND APPARATUS FOR CONTROLLING A CARD

This invention relates to a method and apparatus for controlling a card.

Heretofore, various techniques have been known for measuring various variables during the operation of a card in order to control the card. In one instance, as described in German GM 7,237,903 a measuring device is used to measure the thickness of a layer of fiber material supplied to a lickerin roll of the card. In this case, the fiber material is passed between a supply roll and a hollow body filled with a gas or with a liquid, which hollow body is provided on the side contacting the layer of fiber material with a membrane and which is arranged at a constant distance from the supply roll. During operation, irregularities in the supplied fiber material layer are transmitted via the membrane to the medium in the hollow body and therefrom are transmitted to a pneumatic or hydraulic measuring device. These irregularities in the relatively thick layer of fiber material, however, cause small deformations of the membrane only which, in turn, generate very small pressure variations in the hollow body. As a result, any inaccuracies in the measurements are considerably magnified by the amplification needed to use the measurements.

A further known device is described in Swiss Patent 436,779 and comprises a nozzle through which the sliver delivered by the card passes. The cross-section of the nozzle decreases in the direction of sliver movement while a hollow chamber is provided in the nozzle between two planes arranged at right angles to the nozzle axis. A manometer is also connected to this hollow chamber. The function of this device is based on the compression of the air confined in the fiber material which occurs during passing through the nozzle. This indicates a value on the manometer which is used as a measuring value for the card control. Such measuring devices frequently are combined with the condensors or trumpets which condense the fiber sliver and are arranged downstream from the web take-off device of the card. However, any variations in the substance cross-section of the fiber material being processed are measured at a moment in which the sliver has already left the card. As a result, the control action of the device influences the material being supplied to the card only after a time lag.

Accordingly, it is an object of the invention to measure fiber material passing through a card to establish a measuring value based on which the material supply and/or the material delivery is controlled so that a card sliver as uniform as possible is obtained and so that long-term variations are levelled out.

It is another object of the invention to provide a simple method of determining changes in a fiber layer being processed on a card.

It is another object of the invention to provide a simple apparatus for responding to changes in a fiber layer on a card to maintain a uniform output.

It is another object of the invention to provide a means of responding rapidly to changes in fiber layer thickness on a card to adjust the operation of the card to compensate for these changes.

Briefly, this invention relates to a method of controlling a card and to a card for producing uniform sliver.

The method of the invention is directed to the control of a card having a plurality of operating elements for producing a sliver including a rotating main cylinder, a plurality of flats, a licker-in roll and doffing rolls downstream of the main cylinder. The method comprises the steps of measuring pressure differences in the fiber layer received and conveyed on the main cylinder due to variations in fiber layer thickness and controlling at least one of the operating rolls in the path of the fiber layer in response to predetermined measured pressure differences to obtain a uniform sliver.

The card of the invention has a plurality of operating elements including a rotatable main cylinder for receiving and conveying a fiber layer thereon, a plurality of flats about the cylinder, a licker-in roll for transferring a fiber layer to the cylinder and a doffing roll downstream of the main cylinder. In accordance with the invention, a plate is disposed a preset distance above the cylinder to define a chamber therebetween for passage of the fiber layer. In addition, a measuring and control means for controlling at least one of the rolls in the path of the fiber layers is disposed at a point remote from the cylinder and a duct is connected between the plate and the measuring and control means. The duct is also placed in communication with a sensing point below the plate to transmit pneumatic signals corresponding to variations in the thickness of the fiber layer thereat from the sensing point to the measuring and control means. This latter means compares the pressure prevailing at the sensing point with a pre-set value to produce a difference signal for controlling an operating element of the card.

The operating element of the card which is controlled may be a gear drive or variable speed drive for driving a supply means which delivers fiber upstream of the licker-in roll or for driving a doffing means or condensing means downstream of the main cylinder.

The invention is based on the findings that pressure variations occur in the material confined in the chambers between the main cylinder and the cover plates of the main cylinder at any place along the circumference of the main cylinder which are proportional to the thickness variations of the processed fiber material. The method of establishing measuring values and of controlling a card is thus characterized in that pressure differences in the fiber layer or web on the main cylinder, caused by the thickness variations of the fiber web, are taken into account for controlling the card.

Figure 2:
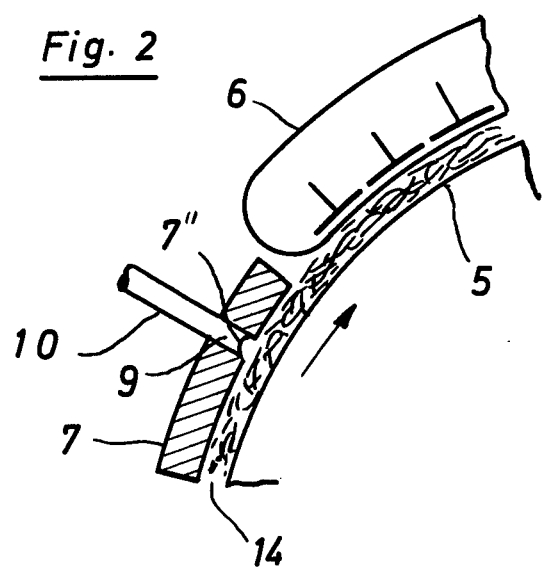

These and other objects and advantages of the invention will become more apparent from the following detailed description and the appended claims therewith taken in conjunction with the accompanying drawings in which:

FIG. 1 illustrates a schematic view of a card with pressure measuring connection points in accordance with the invention; and FIG. 2 illustrates an enlarged detail of an example of a measuring point according to FIG. 1.

Referring to FIG. 1, a card 2 has a plurality of operating elements including, inter alia, a supply means in the form of a feed roll 1 which together with a licker-in roll 3 delivers fiber material in the form of a compact air containing fiber layer 4 in the usual manner to a rotating main cylinder 5. A plurality of flats 6 is disposed about the cylinder 5 as is known.

A sensing point 8 is established between the first plurality or set of flats 6 and the licker-in roll 3 for sensing of the thickness of the moving fiber layer 4. For this purpose, a suitable sensing or measuring means is provided at the sensing point 8 in the form of a cover plate 7 which is disposed a preset distance above the main cylinder 5 to define a chamber therebetween for the passage of the fiber layer 4. In addition, the plate 7 has a bore 9 which is provided with a connecting nozzle 10 so as to communicate the point 8 located under the plate 7 with the opposite side of the plate 7.

Referring to FIG. 1, a measuring and control means 12 is connected via a duct 11 to the nozzle 10. The duct 11 by being in communication with the point 8 via the nozzle 10 and bore 9 is able to transmit pneumatic signals corresponding to variations in the thicknesses of the fiber layer at the sensing point 8 to the measuring and control means 12. This measuring and control means 12 is constructed to compare the pneumatic signals (i.e. pressure variations) transmitted from the sensing point 8 with a pre-set value and to take detected deviations into account for controlling the supply of the fiber layer 4.

The control of the fiber supply can be effected by a control gear drive 13 which is controlled by the measuring and control means 12. As shown, the feed roll 1 and the licker-in roll 3 can be driven individually via a controllable gear drive 13 or variable speed drive 13', respectively. The drives 13, 13' are driven off a motor 16 which is also connected via a gear train to the main cylinder 5 to drive the same. In addition, the motor 16 is used to drive a doffing means in the form of a doffer roll 15 and a pair of take-off rolls 19 downstream of the main cylinder 5 via a transmission 17 and a controllable gear drive or variable speed drive 18. This latter drive 18 may also be used to operate a condensing means 20 downstream of the main cylinder 5 and doffing means. Such a condensing means 20 is of conventional construction and includes condensing rolls which are used with a condenser 21 disposed between the rolls 19 and rolls 20 to condense a fiber layer into a sliver.

During operation, after delivery from the licker-in roll 3 to the main cylinder 5, the fiber layer 4 is conveyed under the cover plate 7 (FIG. 2) in the form of a thin fiber web 14 to the set of flats 6. If the thickness of the fiber web 14 varies over the whole cross-section or at individual locations only, a pressure difference Δ P results at the sensing point 8, namely an increase in pressure as the thickness of the fiber web 14 increases and correspondingly a decrease in pressure as the thickness decreases. The difference in pressure is then sensed in the measuring and control means 12 via the ducts 11 and the measuring and control means 12 produces, for example, a difference signal when the measured pressure varies from a preset value so that any one or all of the operating elements, such as the supply means, doffing means and condensing means, can be adjusted to compensate for the change. To this end, the difference signal is emitted to one or all of the drives 13, 13', 18 to make the necessary adjustment in the rate of supply, doffing or condensing.

If the production rate of the car is increased or if the material to be processed is changed, a shift in the pressure level at the measuring points merely results. The relative deviations, however, caused by variations in the thickness of the fiber web remain constant.

Thus, an adjustment carried out once in each case takes care of the card production rate set or of the fiber material processed.

The sensing point, or points respectively, can also be provided in a cover plate 7' located downstream of the set of flats 6' or, if a plurality of sets of flats 6 and 6' is used, can also be provided between the sets of flats as indicated with dash-dotted lines in FIG. 1. Instead of using only one sensing point 8, a plurality of sensing points can be arranged over the width of the cylinder 5. In this case, the signals transferred from these sensing points are summed up by the measuring and control means 12. Also, the sending points 8 can be connected pneumatically on the side facing the main cylinder 5 by a groove 7' so that only one bore 9 is required through the plate 7.

Instead of sets of revolving flats, stationary carding plates can be provided without affecting or changing the substance of the present invention.

Since a card is usually provided with cover plates, no special devices need be provided in order to carry out the invention on existing equipment. This, of course, can be a decisive advantage.

A further advantage of the invention resides in the fact that the location of the sensing points can be chosen at almost any place along the circumference of the card main cylinder. Thus, it is possible to check variations in the thickness of the fiber layer on the main cylinder in close vicinity of the point of supply where the fiber layer is fed to the card main cylinder and to effect a correcting action by adjusting the supply and or the delivery with a minimum time lag. Also, the sliver section can be checked over very short lengths to determine deviations from a determined set value. Thus, it is possible to level out not only long term periodic variations but also medium term periodic variations.

What is claimed is:

1. A method of controlling a card having a plurality of operating elements for producing a sliver including a rotating main cylinder receiving and conveying a fiber layer thereon, a plurality of flats disposed about the cylinder, a licker-in roll for transferring a fiber layer to the cylinder and doffing rolls downstream of said main cylinder for doffing the fiber layer from the main cylinder; said method comprising the steps of
measuring pressure differences caused by air contained in the fiber layer on the main cylinder due to variations in fiber layer thickness and independently of any outside air source, the amount of contained air being correlated to the thickness of the fiber layer; and
controlling at least one of the operating rolls in the path of the fiber layer in response to predetermined measured pressure differences to obtain a uniform sliver.

2. A card comprising
a plurality of operating elements for producing a sliver from delivered fiber material, said elements including a rotatable main cylinder for receiving and conveying an air containing fiber layer thereon, a plurality of flats disposed about said cylinder, a licker-in roll for transferring a fiber layer to said cylinder and a doffing roll downstream of said main cylinder for doffing the fiber layer from the main cylinder;
a plate disposed a preset distance above said cylinder and conforming to the surface of said cylinder to define a chamber therebetween for passage of the fiber layer;
a measuring and control means for controlling at least one of said rolls in the path of the fiber layer, said means comparing the pressure prevailing at a sensing point below said plate in said chamber with a preset value to produce a difference signal for controlling said one roll; and a duct connected between said plate and said measuring and control means and being in communication with said sensing point to transmit pneumatic signals caused by the air contained in the fiber layer and corresponding to variations in the thickness of the fiber layer thereat from said sending point to said means and independently of any outside air source.

3. A card as set forth in claim 2 wherein said operating elements further comprise a supply means having a feed roll for delivering fiber upstream of said licker-in roll and a controllable gear drive for driving said feed roll and wherein said measuring and control means controls said feed roll.

4. A card as set forth in claim 2 wherein said operating elements further comprise a supply means having a feed roll for delivering fiber upstream of said licker-in roll and a variable speed drive for driving said feed roll and wherein said measuring and control means controls said feed roll.

5. A card as set forth in claim 2 which further comprises a doffing means having said doffing roll therein and a pair of take-off rolls for doffing the fiber layer from said cylinder and a controllable gear drive for driving said rolls of said doffing means and wherein said measuring and control means controls said rolls of said doffing means.

6. A card as set forth in claim 2 which further comprises a doffing means having said doffing roll therein and a pair of take-off rolls for doffing the fiber layer from said card and a variable speed drive for driving said rolls of said doffing means and wherein said measuring and control means controls said rolls of said doffing means.

7. A card as set forth in claim 2 which further comprises a condensing means having condensing rolls downstream of said cylinder for condensing a fiber layer into a sliver and wherein said measuring and control means is connected to said condensing means to control the operation of said condensing rolls.

8. A card as set forth in claim 2 wherein said plate is disposed between said licker-in roll and said flats in the direction of the conveyed fiber layer.

9. In combination with a card having a main cylinder for receiving and conveying a fiber layer, at least one set of flats disposed about said cylinder, a licker-in roll for transferring a fiber layer to said cylinder and a doffing roll for doffing the fiber layer from said cylinder;

fist means for pneumatically sensing the air pressure in a fiber layer independently of any outside air source at at last one sensing point on said cylinder, and a measuring and control means for receiving pneumatic signals from said first means corresponding to thicknesses of the fiber layer at said sensing point to produce a control signal for said card corresponding to a difference between the pressure prevailing at said sensing point and a preset value, said control signal being used to control at least one of said rolls in the path of the fiber layer of said card to effect production of a uniform sliver.

10. In combination with a card having a main cylinder for receiving and conveying a fiber layer, at least one set of flats about said cylinder, a licker-in roll for transferring a fiber layer to said cylinder, a supply roll for delivering fiber material to said licker-in roll, a doffing means downstream of said cylinder for doffing the fiber layer therefrom and a condensing means downstream of said doffing means for condensing a fiber layer into a sliver;

first means for pneumatically sensing the air pressure in the fiber layer on said cylinder independently of any outside air source at a sensing point; and a measuring and control means for receiving pneumatic signals from said first means corresponding to thicknesses of the fiber layer at said sensing point and for comparing said signals to a preset value to produce a difference signal in response to deviations of said received signals from said preset value for controlling at least one of said supply roll, licker-in roll and doffing means.

11. A card comprising a plurality of operating elements for producing a sliver from delivered fiber material, said elements including a rotatable main cylinder for receiving and conveying an air containing fiber layer thereon, a licker-in roll for transferring a fiber layer to said cylinder and a doffing roll downstream of said main cylinder for doffing the fiber layer from the main cylinder;

a plate disposed a preset distance above said cylinder downstream of and adjacent to said licker-in roll in the direction of the conveyed fiber layer to define a chamber of small height therebetween for passage of the fiber layer under and along said plate;

a measuring and control means for controlling at least one of said rolls in the path of the fiber layer in response to variations in the fiber layer thickness within said chamber; and a duct connected between said plate and said measuring and control means and being in communication with a sensing point below said plate to transmit pneumatic signals caused by the air contained in the fiber layer and corresponding to variations in the thickness of the fiber layer thereat from said sensing point to said means.

* * * * *

UNITED STATES PATENT AND TRADEMARK OFFICE
CERTIFICATE OF CORRECTION

PATENT NO. : 4,075,739
DATED : February 28, 1978
INVENTOR(S) : Paul Staheli

It is certified that error appears in the above-identified patent and that said Letters Patent are hereby corrected as shown below:

Column 1, line 38, change "passing" to --passage--

Column 2, line 68, after "sensing" delete --of--

Column 4, line 8, change "sending" to --sensing--

In the Claims

Column 5, line 8, change "sending" to --sensing--

Column 5, line 52, change "fist" to --first--

Signed and Sealed this

Twenty-ninth Day of August 1978

[SEAL]

Attest:

RUTH C. MASON
*Attesting Officer*

DONALD W. BANNER
*Commissioner of Patents and Trademarks*